July 12, 1966 J. M. BASON 3,260,379
MECHANICAL HANDLING APPARATUS
Filed April 24, 1962 9 Sheets-Sheet 1

James M. Bason
INVENTOR:

BY
Bierman + Bierman
Attorneys

July 12, 1966 J. M. BASON 3,260,379
MECHANICAL HANDLING APPARATUS
Filed April 24, 1962 9 Sheets-Sheet 2

Fig. 2.

INVENTOR:
James M. Bason
BY
Bierman + Bierman
Attorneys

July 12, 1966   J. M. BASON   3,260,379
MECHANICAL HANDLING APPARATUS
Filed April 24, 1962   9 Sheets-Sheet 4

INVENTOR:
James M. Bason
BY
Bierman + Bierman
Attorneys

July 12, 1966 J. M. BASON 3,260,379
MECHANICAL HANDLING APPARATUS
Filed April 24, 1962 9 Sheets-Sheet 7

Fig. 6.

INVENTOR
James M. Bason
BY
Bierman + Bierman
Attorneys

United States Patent Office 3,260,379
Patented July 12, 1966

3,260,379
MECHANICAL HANDLING APPARATUS
James Munro Bason, Stockport, England, assignor to
Bason and Sons Limited, a British company
Filed Apr. 24, 1962, Ser. No. 189,853
4 Claims. (Cl. 214—6)

This invention relates to the mechanical handling of bricks and other rectangular block-like articles of uniform dimensions, its object being to provide a simple and reliable apparatus for marshalling a predetermined number of such articles in angular formation upon a receiving platform and thereafter bodily transporting the whole group of articles to a delivery platform without substantially altering their relative arrangement.

The apparatus hereinafter described is particularly applicable to brick-making plant, in which it has hitherto been customary to employ manual labour for picking up individually the "green bricks" discharged from the press or its equivalent and stacking layers of such bricks upon a trolley in somewhat spaced relation ready for transference to the kiln.

According to the present invention, apparatus for the mechanical handling of bricks or other rectangular block-like articles of uniform dimensions comprises a receiving platform adapted to accommodate a predetermined number of such articles in juxtaposed longitudinal rows; a device for simultaneously gripping the entire assemblage of articles and for lifting and lowering the same with reference to the receiving platform; means for translating the gripping device, whilst suitably elevated, to a position above a delivery platform; and means for releasing the gripping device after the assemblage of articles carried thereby has been lowered to rest upon such delivery platform or upon a previously-deposited layer of similar articles.

Provision may be made angular movement of the gripping device (for example, during its lowering movement) to allow a layer of articles to be deposited upon the delivery platform with its several rows disposed transversely of those of a layer previously laid.

Furthermore in a case where the articles require deposition upon the delivery platform in mutually-spaced relation, the gripping device may be provided with suction nozzles adapted to be engaged with the individual articles whilst the same are compactly arranged upon the receiving platform, and thereafter to be actuated to separate the longitudinal rows of such articles during transference of the same to the delivery platform.

In the accompanying drawings:

FIG. 5b is a continuation of FIG. 5a beginning at the broken line at the bottom of FIG. 5a;

In one example of the mechanical handling apparatus as designed for use in association with equipment producing wire-cut bricks, the latter (indicated at 11) are conveyed in a plurality of (say) nine streams to a receiving platform 12 having side walls 13 with convergent entry portions 13a (FIG. 2a) whereby the bricks 11 arriving substantially simultaneously from the several streams are brought into side-by-side contact across its full width.

The leading bricks 11 are advanced along the platform 12 by those following until they contact a spring-loaded end wall 14, the platform being designed to accept not more than five complete bricks in each of the nine longitudinal rows produced as above described.

Figure 2:
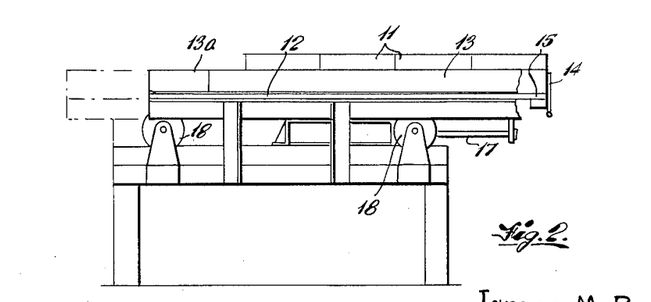
FIG. 2 is an end elevation of the same.
Figure 3:
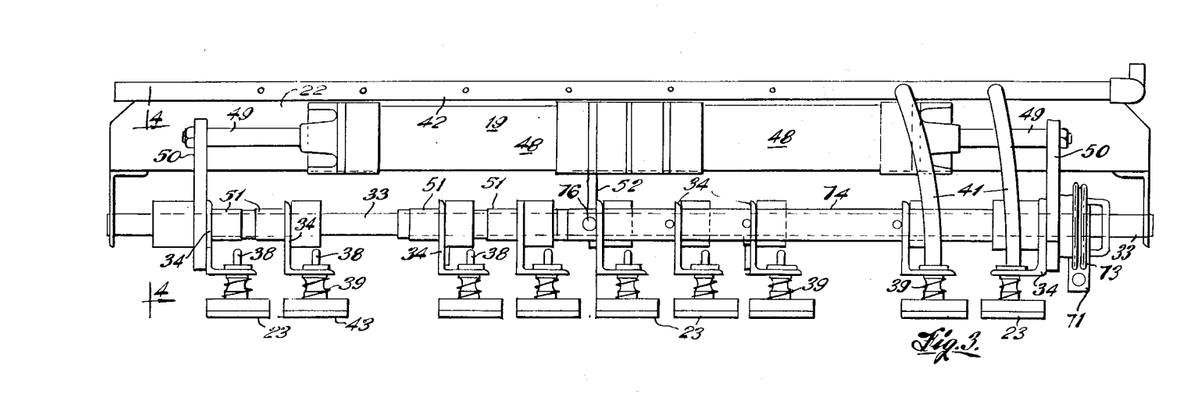
FIG. 3 is an enlarged front elevation of the gripper head indicated in FIGS. 1 and 2.
Figure 4:
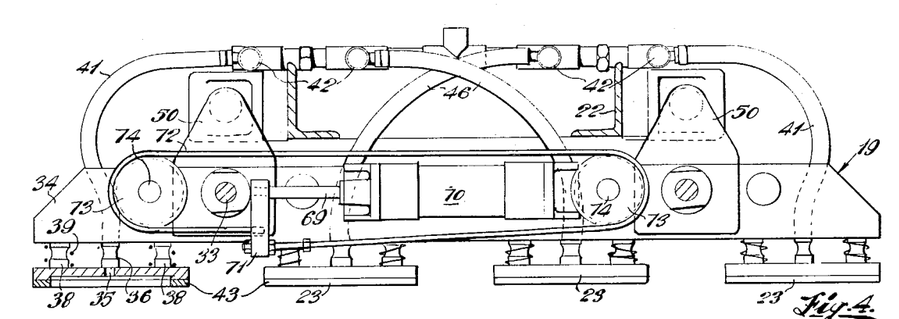
FIG. 4 is a section on the line 4—4 of FIG. 3.

As the bricks arrive at the end wall 14 they depress a plate 15 operating a pilot valve 16 (FIG. 10), which in turn energizes a pneumatic ram 17 or rams whereby the platform 12 is moved forwards or to the left in FIG. 2 on rollers 18, so that the fifth brick in each row becomes separated (by, say, 10 inches) form the brick following it, this advancement of the platform bringing the first thirty-six bricks in compact rectangular assemblage, directly beneath a suction-operated gripper head 19.

This gripper head is suspended from a carriage 20 on an overhead track 21 extending at right angles to the direction of travel of the receiving platform 12 and comprises a horizontal rectangular frame 22 which is provided at its underside with thirty-six suction nozzles 23 arranged correspondingly to the assemblage of bricks aforesaid. i.e. in nine rows of four nozzles each (see FIGS. 3–5b).

Figure 6:
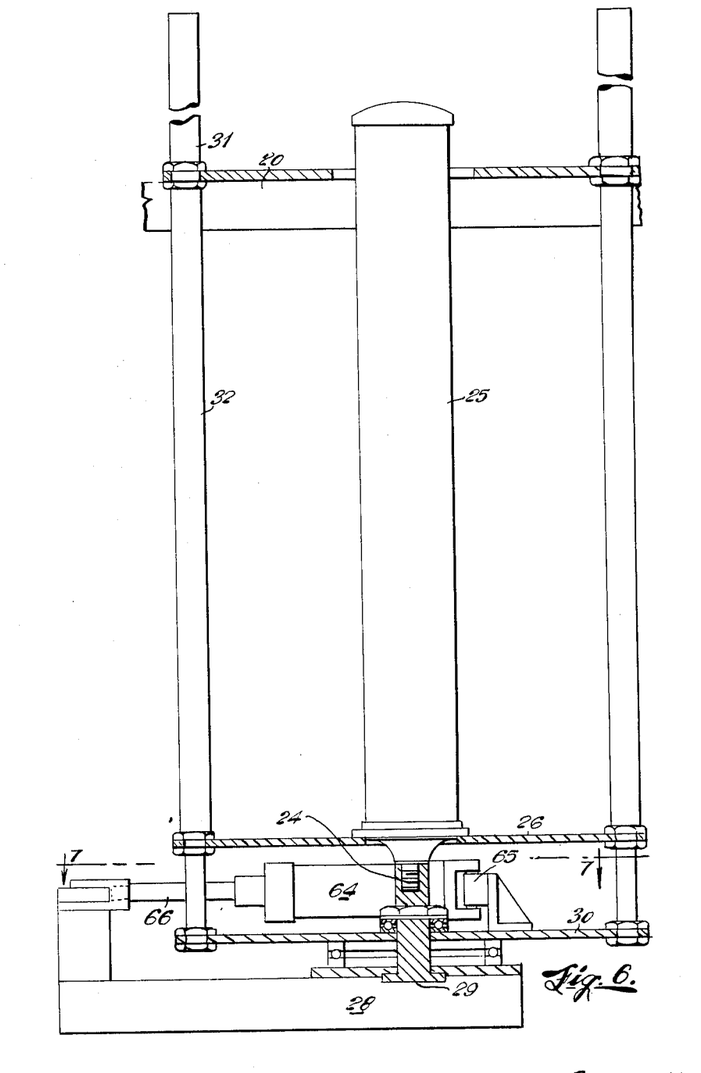
FIG. 6 is an enlarged section on the line 6—6 of FIG. 2.
Figure 7:
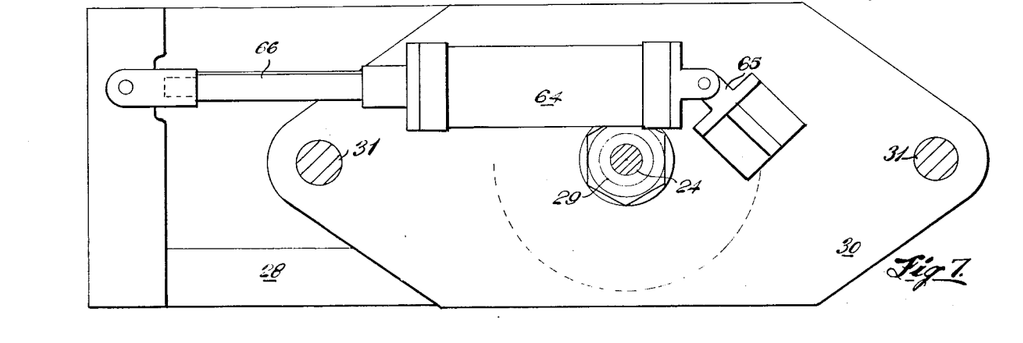
FIG. 7 is a section on the line 7—7 of FIG. 6.

The aforesaid suspension of the gripper frame 27 is effected through the medium of a pneumatic ram 24 whose cylinder 25 depends vertically from the overhead carriage 20, a mounting plate 26 at its lower end being connected to such carriage by tie-bars 27 at opposite sides of the cylinder 25 (FIGS. 6 and 7).

Figure 1:
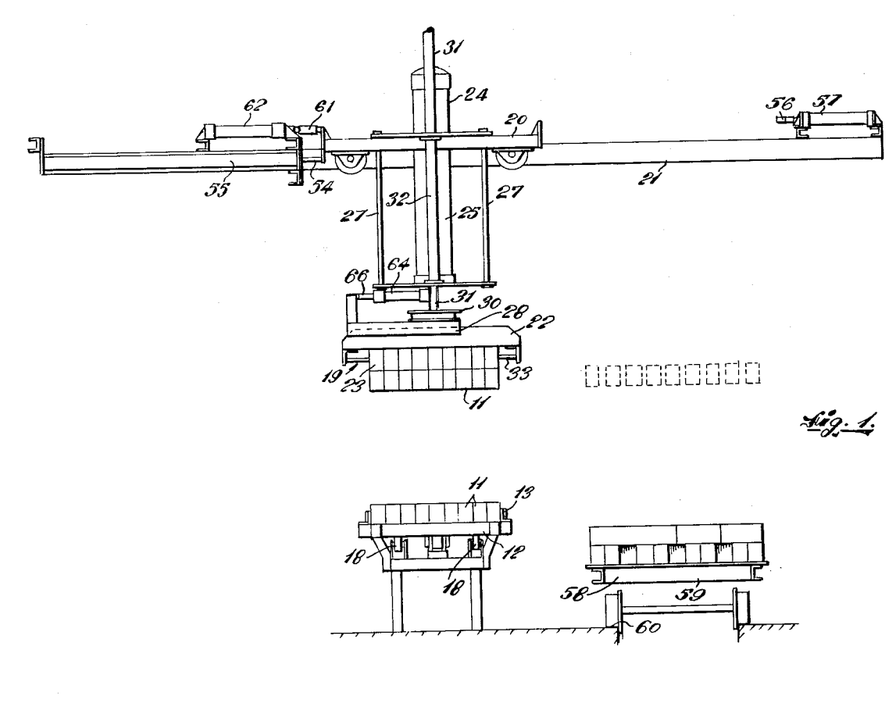
FIG. 1 is a front elevation of a mechanical handling apparatus embodying the present invention.

A sub-frame 28 attached to the gripper frame 22 is rotatably mounted upon the ram head 29 which is journalled in a horizontal plate 30 provided with vertically-upstanding guide rods 31, these latter being arranged at opposite sides of the cylinder 25, in a plane at right angles to that which contains the tie-bars 27 (FIGS. 1 and 2), and being slidable in tubes 32 fixed between the carriage 20 and the cylinder mounting plate 26, so that the ram 24 is angularly located with reference to the cylinder 25.

Two slide-bars 33 fixed in the gripper frame 22 have mounted thereon nine angle-section bars 34 (FIGS. 3 and 5a) each of which serves to carry a single row of four suction nozzles 23 at 9-inch intervals, each such nozzle consisting of a flat plate measuring (say) 6 inches by 2½ inches and having a central port 35 (FIG. 4) into which is screwed a headed tubular stem 36 passed through a keyhole slot 37 in the horizontal flange of the associated carrier bar 34. Near opposite ends of the nozzle 23 are arranged upstanding pegs 38 carrying compression springs 39 and engaged with further keyhole slots 40 in the carrier bar 34 to prevent rotation of the nozzle upon its central stem 36, whose upper end is connected by flexible tubing 41 to a vacuum pump 86 (FIG. 10) preferably by way of a header tube 42 (FIG. 4) common to all nozzles 23 in the same row.

A continuous gasket 43 of synthetic rubber is secured to the underside of each nozzle 23 around its periphery to ensure air-tight engagement with the upper surface of the adjacent brick 11 when the gripper head 19 is lowered towards the receiving platform 12 by release of a manual valve 44 (FIG. 10) controlling the ram 24.

Simultaneously with the nozzle 23 contacting the bricks 11, the gripper frame 22 actuates a trip valve 45 (FIG. 10) mounted on the side wall 13 of the platform, with resultant operation of the valves 46, 47 to cause automatic application of suction to the nozzles 23.

Two double-acting pneumatic cylinders 48 are mounted back-to-back across each end of the gripper frame 22, their oppositely-directed horizontal rams 49 being connected to brackets 50 on the two outermost nozzle-carriers 34.

The upstanding flange of each of the several carriers 34 carries two bushes 51 which slidably engage the slide-bars 33 and project at opposite sides of the said flange so as to define a laterally-contracted arrangement of the rows of nozzles 23, the distance between the centre-lines of adjacent nozzles corresponding to the width of a single brick 11.

When, and for so long as, the trip valve 45 is held open by the gripper frame 22, air pressure is admitted to the rams 49 in such manner that the latter pull inwards upon the brackets 50, so to maintain the bushes 51 of the several nozzle carriers 34 in mutual contact and in properly spaced relationship to effect brick pick-up. It should be noted that the middle carrier is bracketed at 52 to the gripper frame 22, to ensure centralization of the nozzle assemblage with reference to the latter.

Once the pneumatic pick-up has been effected as above described, the manual valve 44 can be operated to cause the gripper head 19 to raise the entire pack of bricks 11 to any desired height allowed by the stroke of the ram 24.

Operation of a further manual valve 53 (FIG. 10) will then admit air to a double-acting ram 54 whose cylinder 55 is mounted horizontally within the overhead track 21, this ram being connected to one end of the carriage 20 so that the resultant longitudinal movement of the latter traverses the gripper head 19 sideways to a position directly above a delivery station.

At this point the carriage 20 abuts a buffer ram 56 in a pneumatic cylinder 57 (FIG. 1) mounted above the track 21 and is brought smoothly to a halt without risk of dislodgement of the suction-held bricks 11.

By releasing the manual valve 44 (FIG. 10), and hence the pressure under the ram 24, the pack of bricks held by the gripper head 19 can be now lowered to the delivery station, conveniently represented by the platform 58 of a wheeled trolley 59 mounted on rails 60 leading into the kiln.

When the platform 58 takes the weight of the bricks 11, the suction previously applied to the latter is released by manual operation of the semi-automatic valve 46, leaving the gripper head 19 free to be raised and traversed back to its original position by means of the rams 24, 54 respectively.

The carriage 20 is brought to rest immediately above the receiving platform 12 by striking a second buffer ram 61 in a pneumatic cylinder 62 arranged in opposition to the cylinder 57, after which the gripper head 19 can be lowered to effect automatic operation of the suction valve 46 whereby the nozzles 23 take hold of a second pack of bricks 11 for eventual superimposition upon the pack previously laid upon the delivery platform 58.

Figure 10:
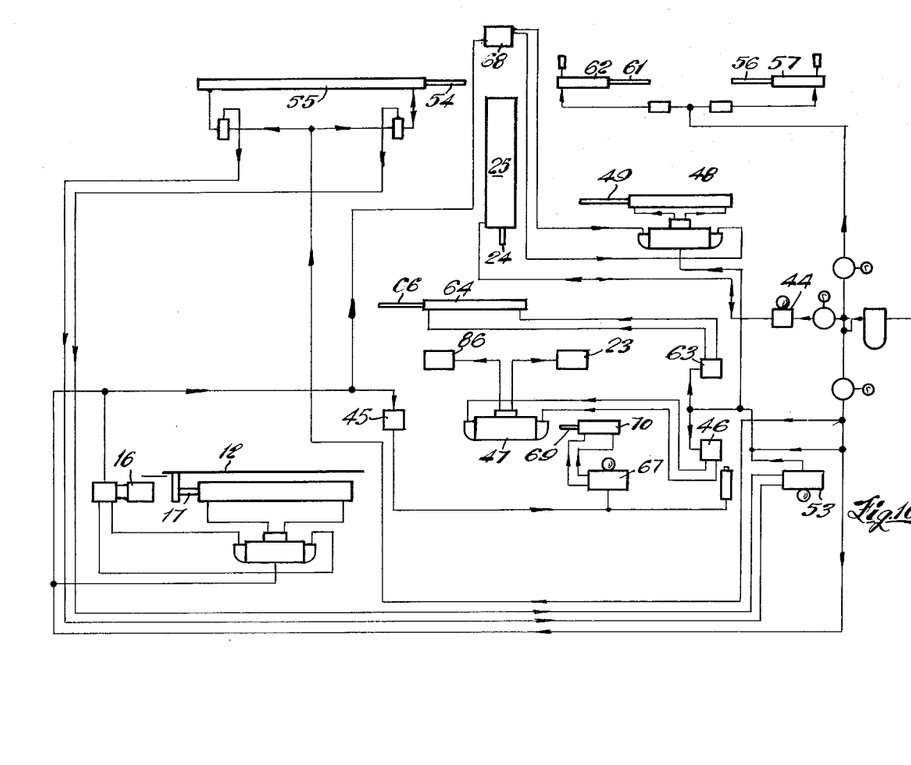
FIG. 10 is a diagram showing the pneumatic circuit of of the apparatus.

For security of a stack of bricks built up in this fashion on the delivery platform, it is desirable that alternate courses (or pairs of courses) be laid transversely of the rest, the necessary angular movement of the gripper head 19 for this purpose being effectible, at any moment whilst the ram 24 is raised, by operation of a manual valve 63 (FIG. 10).

This admits air to a double-acting cylinder 64 (FIG. 7) which is pivoted at 65, for movement in a horizontal plane, upon the non-rotary plate 30 associated with the cylinder 25, and which has its ram 66 connected to one end of the gripper sub-frame 28 in such manner that its full stroke rotates the latter (and hence the gripper head 19) through 90 degrees.

When stacking bricks for movement into a kiln, it is also desirable that the several rows of each course laid upon the platform 58 shall be spaced apart (say) ¾ inch, since this will ensure that the stack is effectively ventilated when alternate courses are cross-laid as above desccribed.

Furthermore, to allow the stack of bricks 11 subsequently to be picked up by a fork-lift truck, it is convenient to modify the spacing of the rows in the first course, to provide relatively-wide passages for the entry of the fork-tines.

In a common arrangement, such tines are five in number, the outer ones having a simple inward gripping movement whilst each of the others is laterally expansible in opposite directions, the pitch of the tines being such that the two juxaposed rows of bricks can be received, and gripped, between any one tine and the next.

Either of these two alternative methods of spacing the rows of bricks in the pack can be selected by means of a manual valve 67 (FIG. 10) whenever the trip valve 45 is held open by descent of the gripper frame 22 upon the receiving platform 12, the selected method being automatically carried into effect as soon as the carriage 20 is traversed towards the delivery station and so releases a further trip valve 68.

For convenience in describing the spacing mechanism, the nine nozzle-carriers 34 of the gripper head 19 will be distinguished by the latters A to I (FIG. 5b), it being remembered that the middle angle E is fixed whilst the rest are movable along the slide-bars 33.

Operation of the valve 67 in one direction admits air to two double-acting rams 69 (FIG. 4) whose cylinders 70 are mounted at opposite sides of the gripper frame 22 in parallel relation to the nozzle-carriers aforesaid.

Each such ram is anchored at 71 to opposite ends of a chain 72 extending around sprockets 73 on two rotatable and axially movable shafts 74 which are journalled at 75 in the adjacent carrier. A (or I) in parallel relation to its supporting slide-bars 33, being substantially shorter than the latter, as shown in FIG. 5. The two pairs of shafts 74 are mutually staggered, and the nozzle-carriers B to H have clearance holes for their reception and permitting their axial movement.

When such carriers are pulled together by the rams 49 as above described, five of them (B to F, or H to D) are intersected by each shaft 74, which has a radial peg 76 fixed near its free end.

Figure 8:
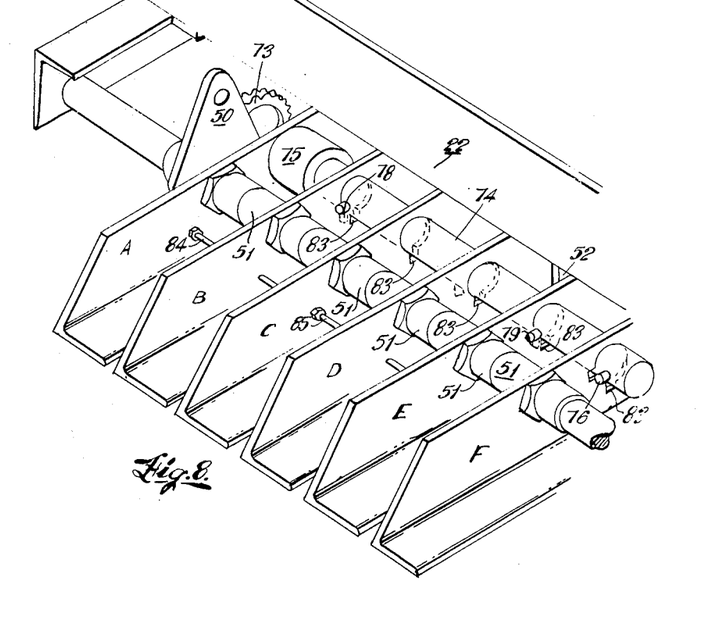
FIGS. 8 and 9 are fragmentary perspective views illustrating conditions of the gripper head alternative to that shown in FIGS. 3 and 5.

If wide gaps are to be provided at intervals across the middle of the pack to allow entry of fork tines (i.e. in the first course of the stack) the shaft 74 are pre-set (by means of the selector valve 67) to a position in which the pegs 76 are aligned with notches 77 at the sides of the clearance holes in the carriers F, D (see FIG. 8).

Figure 5A:
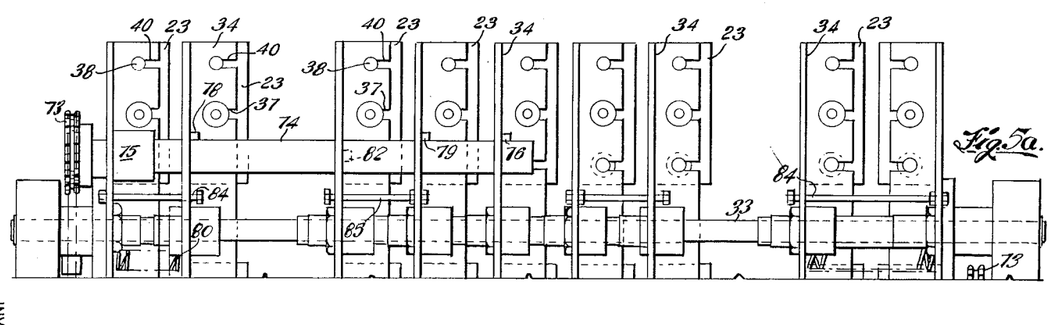
FIG. 5a is a plan view of the gripper head with certain parts thereof omitted removed for the sake of clarity.
Figure 5B:
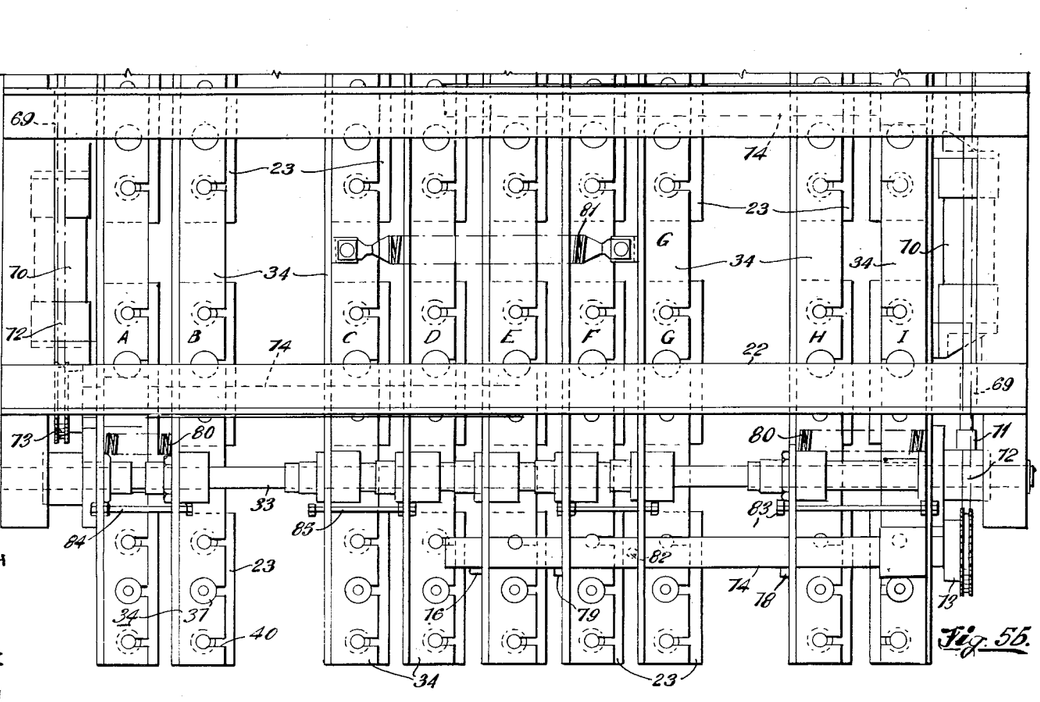

Thus, when release of the trip valve 68 produces automatic reversal of the thrust exerted by the rams 49, the two end carriers A and I are free to move outwards or in a direction away from one another until the pegs 76 on their shafts 74 abut against the fixed central carrier E as shown in FIGS. 5a and 5b.

During such movement of the outermost carriers A and I the adjacent carriers B and H are held close up to them by means of other radial pegs 78 on the shafts 74, whilst still additional pegs 79 on the shafts 74 serve to maintain the carriers D and F in their original relationship to the fixed carrier E (see FIG. 5).

In consequence wide gaps are opened between the second and third, and the seventh and eighth, rows of bricks as in FIGS. 5a and 5b to admit two tines of a 5-tined lifting fork, space being provided for the center by manual removal of the fifth row of bricks.

Any tendency for the intermediate carriers to float or shift their relative position is resisted by compression springs 80 between carriers A and B and H and I and a tension spring 81 between carriers C and G.

The gripper head 19 remains in the condition just described until it is again lowered to the receiving platform 12 and the trip valve 45 opened to cause reversal of air pressure upon the rams 49 which then restore the nozzle-carriers 34 to their original closely-spaced relationship (FIG. 8).

In order to space the rows of bricks 11 uniformly in the second, and each subsequent, course laid on the delivery platform 58, the operator moves his selector valve 67 so that the rams 69 turn the shafts 74 through 90 degrees from their original position, whereupon the pegs 76, 78, 79, and a fourth peg 82 at right angles to the others on each shaft are so positioned that on axial movement of the shafts 74, said pegs will pass through appropriately-arranged notches 83 in the adjacent nozzle-carriers 34.

Figure 9:
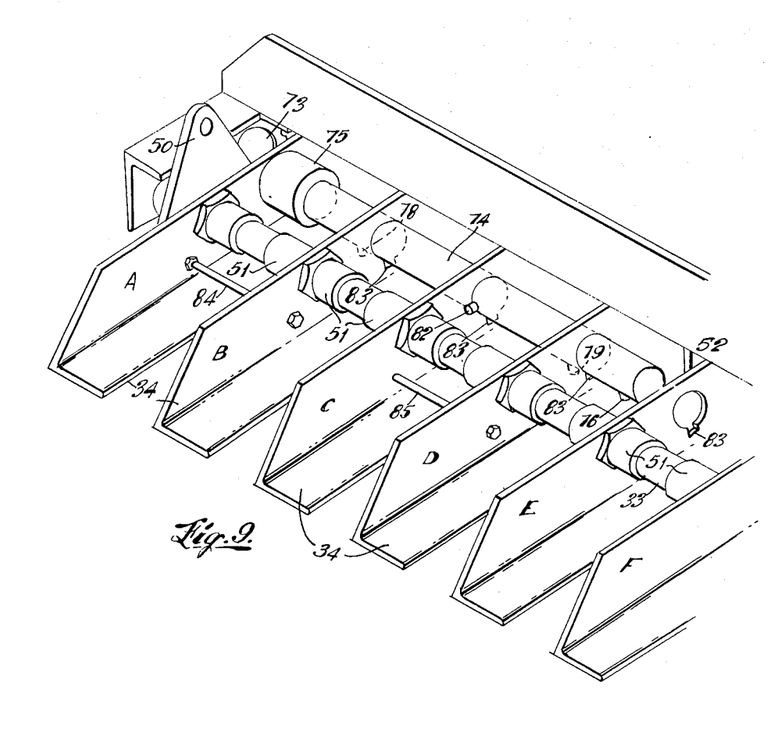

In consequence the outermost carriers A, I move outwards to the full limit of the slide-bars 33, dragging the carriers B, H along with them through the medium of connecting bolts 84, the carriers C, G being similarly displaced by the pegs 82 and dragging the carriers D, F along with them by means of further bolts 85 (see FIG. 9).

Thus, by the rotative movements of the shafts 74 and the required alignment or disalignment of the radial pegs 75, 78, 79 thereon, with the notches 83 in the carriers, and the axial movement of the shafts 74, the carriers will be moved together, with their bushes 51 brought into contact as shown in FIG. 8, or else be separated in the required spacing as shown in FIG. 9.

The overall width of the pack expanded in this fashion is substantially the same as that of a pack in which wide gaps have been opened as previously described, and likewise corresponds to the length of a row of four bricks, so that the stack produced is square in planform.

It will be appreciated that the same technique may be adopted when dealing with narrow bricks arranged in a 10 x 4 pack, the only modification required being a different spacing and arrangement of the pegs on the shafts 74.

The apparatus forming the subject of the present invention may be controlled from a console placed at any convenient (but not necessarily adjacent) position and a seat for the operator may be provided. It has been found convenient to control the vertical and lateral movements of the gripper head 19 by means of levers at opposite sides of such seat, the operator having pedal controls for the rotation of the gripper head and the release of vacuum therefrom, as well as a further hand control for pre-selection of the spacing arrangement.

Obviously, if desired, some or all of the various rams may be operated automatically in appropriate sequence whenever the predetermined number of bricks 11 has been marshalled upon the receiving platform 12, and in this event the lifting and lowering movements of the gripper head 19 may be varied step-by-step to suit the height of the stack on the delivery platform 58.

Experience shows that the efficiency of the suction pick-up is unaffected by dust or small irregularities on the upper surfaces of the bricks 11, but a major defect in one or more of the latter may result in the associated nozzles 23 failing to make air-tight engagement therewith and hence reducing the vacuum applicable to the remainder.

For this reason, the vacuum pump 86 should have sufficient capacity to ensure that, even if up to 50 percent of the nozzles should fail to take hold due to defects in the bricks engaged thereby, the remaining bricks will still be securely gripped.

I claim:

1. An apparatus for the handling of bricks and similarly shaped articles comprising, a receiving platform adapted to accommodate a predetermined number of such articles in juxtaposed rows, a carrier including a plurality of suction nozzles arranged in rows corresponding to the articles engaged thereby, said nozzles suctionally engaging the faces of and gripping the entire assemblage of articles, means for lifting or lowering the carrier, means for bringing the carrier while elevated to a position above a delivery platform, means for producing automatic separation of the articles to arrange them into divided groups with spacing between them once the carrier has been raised from the receiving platform and has moved laterally thereto, means for releasing the articles from the suction nozzles after the assemblage of the articles carried thereby has been lowered to rest upon the delivery platform or upon a previously deposited layer of similar articles, the carrier including a supporting frame, carrier bars slidable laterally of the supporting frame, the rows of nozzles being mounted on the carrier bars, pneumatic rams connected to the outermost of the carrier bars and serving to hold the said carrier bars in mutual contact while the carrier is applied to the receiving platform, rotative shafts mounted in the carrier and extending in the direction of sliding movement of the carrier bars, said shafts having pegs which release the bars for outward movement either in groups or individually according to the angular position of said shafts.

2. An apparatus for the handling of bricks or similar articles comprising, a receiving platform adapted to accommodate a number of the articles in juxtaposed rows, a suction gripping device for simultaneously gripping the entire assemblage of articles and for lifting and then lowering the same to deposit them on a delivery surface, the gripping device including a frame, carrier bars slidable relatively to the frame, pneumatic rams connected to some of the carrier bars for causing separation or bringing together of the carrier bars, shafts mounted in the frame and rotative therein and extending parallel to the direction of sliding movement of the carrier bars, radial projections on said shafts serving as stops for the positioning of the carrier bars, and means permitting disengagement of such projections from the carrier bars by rotative movement of the shafts relatively to the carrier bars.

3. In an apparatus for handling bricks or the like, a gripping device including a frame, parallel rods extending across the frame, carrier bars slidable on said rods, suction nozzles carried by the carrier bars, pneumatic means for moving some of the carrier bars apart, shafts extending parallel to the rods and provided with radial projections, the carrier bars having notches through which selected projections are passed on movement of the carrier bars relatively to the rods and said projections being capable of positioning by rotation of the shafts to abut against the carrier bars and cause selected positioning of the carrier bars relatively to one another.

4. Apparatus according to claim 3, wherein the shafts extend in opposite directions, chain gearing coupling the shafts together, and pneumatic means operating the gearing on lateral movement of the gripping device from a position above the location of brick pick-up.

References Cited by the Examiner

UNITED STATES PATENTS

| | | |
|---|---|---|
| 961,314 | 6/1910 | Penfield. |
| 1,222,535 | 4/1917 | Crum. |
| 1,601,868 | 10/1926 | Luce. |
| 2,665,013 | 1/1954 | Socke. |
| 2,666,562 | 1/1954 | Birch _____________ 214—309 X |
| 2,710,696 | 6/1955 | Fontaine. |
| 2,903,290 | 9/1959 | Morris et al. _________ 294—65 |
| 2,956,696 | 10/1960 | Drakengren. |
| 2,980,265 | 9/1961 | Johnson et al. |
| 3,101,021 | 8/1963 | Johnson. |

GERALD M. FORLENZA, Primary Examiner.

MORRIS TEMIN, HUGO O. SCHULZ, Examiners.

J. JONES, M. WOLSON, Assistant Examiners.